United States Patent [19]

Hara

[11] Patent Number: 5,388,608
[45] Date of Patent: Feb. 14, 1995

[54] SOLENOID VALVES

[75] Inventor: Masahiko Hara, Atsugi, Japan

[73] Assignee: Unisia Jecs Corporation, Atsugi, Japan

[21] Appl. No.: 191,326

[22] Filed: Feb. 3, 1994

[30] Foreign Application Priority Data

Feb. 8, 1993 [JP] Japan .............................. 5-003301[U]

[51] Int. Cl.6 ............................................. F16L 3/00
[52] U.S. Cl. ..................................... 137/343; 251/367
[58] Field of Search ......................... 137/343; 251/367

[56] References Cited

U.S. PATENT DOCUMENTS 3,504,704  4/1970  Beckett et al. ...................... 251/367
3,589,387  6/1971  Raymond ............................ 251/367
4,098,490  7/1978  Morrison ............................ 251/367
4,285,500  8/1981  Illing et al. ......................... 251/367
4,354,664  10/1982 Taylor et al. ....................... 251/367

FOREIGN PATENT DOCUMENTS 3167061  7/1991  Japan .

Primary Examiner—A. Michael Chambers
Attorney, Agent, or Firm—Bachman & LaPointe

[57] ABSTRACT

In an arrangement having a plurality of solenoid valves disposed between a housing and a housing cover, the cover being attached to the housing by bolts, collar members are disposed around the bolts, and between the housing and the housing cover.

3 Claims, 3 Drawing Sheets

SOLENOID VALVES

BACKGROUND OF THE INVENTION

The present invention relates generally to solenoid valves and more particularly, to solenoid valves of the type arranged between an actuator housing and a cover member in a antilock brake system (hereafter refer to as ABS) for a motor vehicle.

Conventionally, in view of the control relative to pressure increase and decrease and requirements of holding pressure at a constant value, some ABS include a normally open solenoid valve arranged in a brake fluid passage for conducting hydraulic pressure produced in a master cylinder (hereafter refer to as M/C) to a wheel cylinder (hereafter refer to as W/C), and a normally closed solenoid valve arranged in a return passage from W/C. Such ABS may be constructed to enable the individual control of three systems such as a right front wheel, a left front wheel, and right and left rear wheels, including an integrated actuator unit of a housing having six solenoid valves and fluid passages, various members, etc. thereof built therein, and a housing cover. See, for example, JP-A 3-167061.

With such known actuator unit, however, since in a state that a valve function part of each solenoid valve is hermetically fitted in a bore of the housing, the housing cover is disposed on a top of a solenoid part of the solenoid valve, and fixed to the housing by a plurality of bolts, tightening force of the bolts directly operates on each solenoid valve.

As a result, during soft pressure increase and soft pressure decrease of the ABS control, surging occurs due to overshoot by sudden variations of hydraulic pressure. In case of soft pressure increase, for example, surging as shown in FIG. 3 occurs. Referring to FIG. 3, surging generating phenomena will be described. Suppose that the solenoid valve is now in the ON state to hold hydraulic pressure supplied to W/C at a constant value. In this state, if a pulse signal is generated to control the solenoid valve to be OFF. instantaneous pressure increase is produced corresponding to the width of the pulse signal. Since an action of the solenoid valve has time lags $t_1$, $t_2$ upon rise and fall of the pulse signal, surging with the maximum damping width as indicated by $\Delta P2$ occurs with respect to an expected soft pressure increase amount $\Delta P1$. Likewise, surging occurs upon soft pressure decrease. Such surging is transmitted to a vehicular body, causing uncomfortable vibration noise.

It is, therefore, an object of the present invention to provide solenoid valves which contribute to a restraint of surging upon soft pressure increase and soft pressure decrease.

SUMMARY OF THE INVENTION

There is provided, according to the present invention, in an arrangement:
a housing;
a cover arranged to conceal said housing;
a plurality of solenoid valves disposed between said housing and said cover;
at least one bolt arranged to attach said cover to said housing; and
a collar member disposed around said at least one bolt, said collar member being arranged between said housing and said cover.

DETAILED DESCRIPTION OF THE INVENTION

Figure 1:
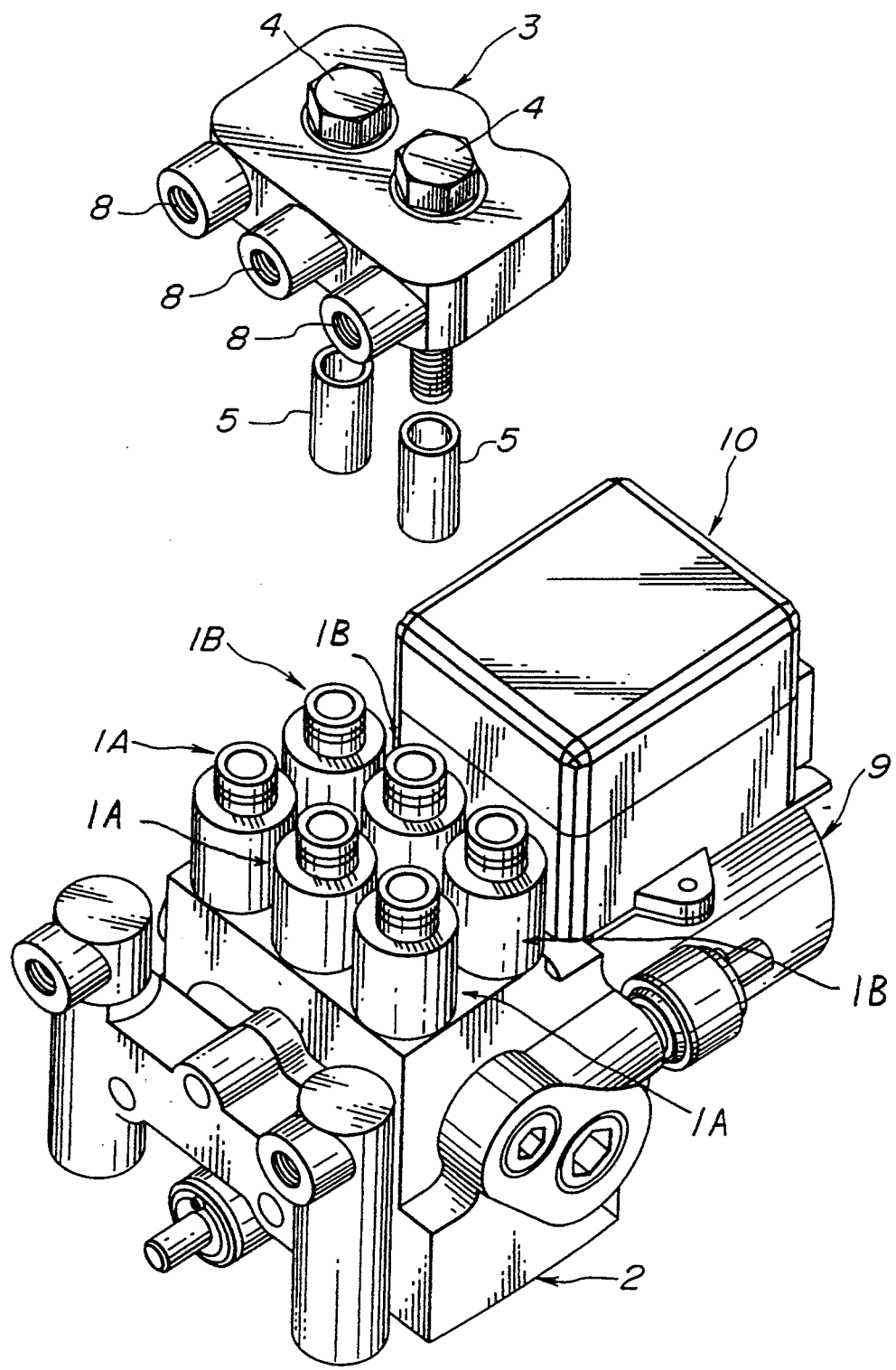
FIG. 1 is an exploded perspective view showing a preferred embodiment of solenoid valves according to the present invention.
Figure 2:
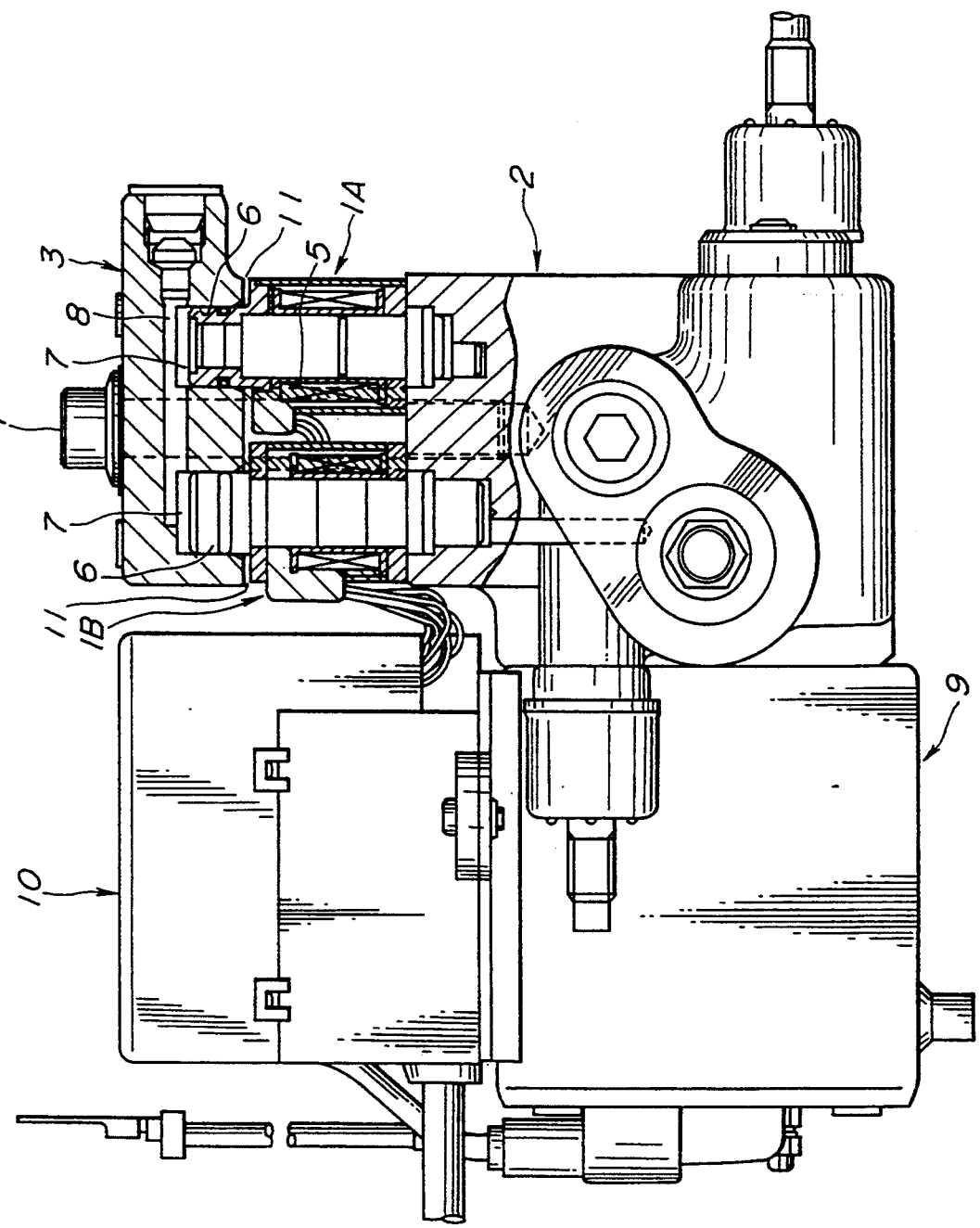
FIG. 2 is a side view, partly in section, showing the solenoid valves.
Figure 3:
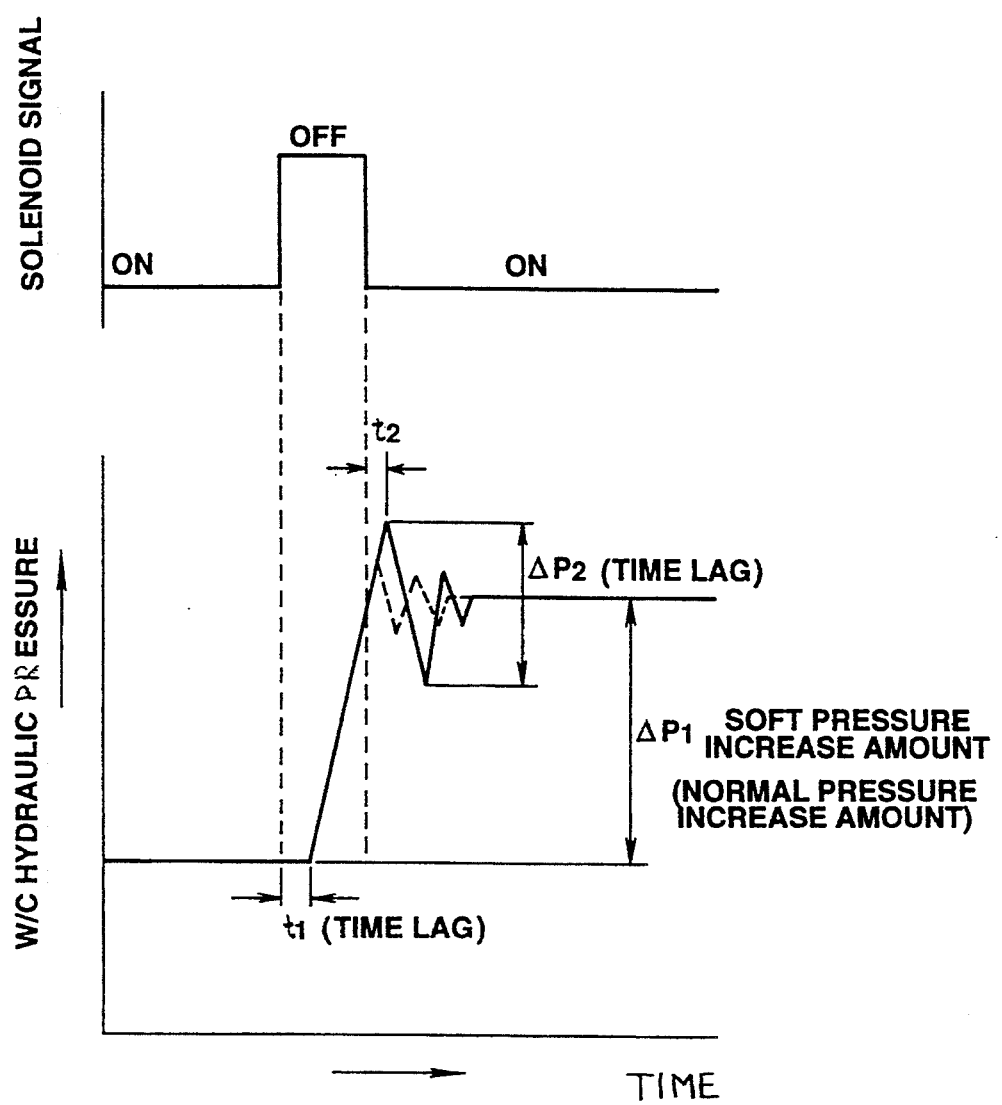
FIG. 3 is a graphical representation showing surging phenomena occurring upon soft pressure increase control of the solenoid valve.

Referring to FIGS. 1 and 2, three pairs of solenoid valves 1A, 1B are arranged, the solenoid valve 1A being disposed in a brake fluid passage to W/C, and the solenoid valve 1B being disposed in a return passage from W/C. The solenoid valves 1A, 1B are built in an actuator housing 2 which is concealed by a housing cover 3. Two bolts 4 serve to hold the solenoid valves 1A, 1B between the actuator housing 2 and the housing cover 3, and are engaged with collar members 5, respectively. As shown in FIG. 2, formed in the housing cover 3 are valve top support holes 6 with which tops of the solenoid valves 1A, 1B are hermetically engaged, respectively, each valve top support hole 6 having a hydraulic chamber 7 in the ripper portion thereof. Additionally, a hydraulic passage 8 is formed in the housing cover 3 so as to allow hydraulic communication of the hydraulic chambers 7 with a hydraulic source (not shown), etc. Reference numeral 9 designates a pump driving motor, and 10 designates a relay box in which a control relay is accommodated (not shown).

Next, the collar members 5 will be described in detail. The collar members 5 are arranged to hold tightening force of the bolts 4 when attaching the housing cover 3 to the housing 2. Therefore, since a clearance 11 is held between the top (strictly, the shoulder) of each solenoid valve 1A, 1B and the housing cover 3 in a state engaged through the bolts 4 as shown in FIG. 2, and the hydraulic chamber 7 is arranged in each valve top support hole 6, tightening force of the bolts 4 has no effect on the solenoid valves 1A, 1B. In this embodiment, in connection with determination of the length of the collar member 5, the clearance 11 is held between the top of each solenoid valve 1A, 1B and the lower side of the housing cover 3. In place of the clearance 11, a shock absorbing resilient member such as a rubber member may be inserted in a corresponding portion so as to resiliently support the solenoid valves 1A, 1B between the housing 2 and the housing cover 3. It is to be noted that in this case also, the collar members 5 are arranged to hold tightening force of the bolts 4.

With the solenoid valves mounted as described above, when a pulse signal of a short time duration, e.g., several milliseconds, for soft pressure increase or soft pressure decrease is input to the solenoid valve 1A (or 1B) for ABS control, the solenoid valve 1A which is in a closed state to maintain hydraulic pressure is opened by a short time duration corresponding to the pulse signal so as to carry out pressure increase, then closed again. Due to sudden variations of hydraulic pressure produced upon valve closing operation. the solenoid valve 1A undergoes force in the direction to fall away from the housing 2. However, constraint force of the bolts 4 has no effect on the solenoid valve 1A, enabling buffering of the above surge pressure, resulting in restrained occurrence of surging.

What is claimed is:

1. In an arrangement:
   a housing;
   a cover arranged to conceal said housing;
   a collar member interposed between said housing and said cover;
   at least one bolt arranged through said collar member, said at least one bolt serving to attach said cover to said housing; and
   a plurality of solenoid valves disposed between said housing and said cover.

2. An arrangement as claimed in claim 1, wherein said collar member has a length which allows an existence of a predetermined clearance between a shoulder of each of said plurality of solenoid valves and said cover when said cover is attached to said housing by said at least one bolt.

3. In an arrangement:
   a housing;
   a cover arranged to conceal said housing;
   a plurality of collar members interposed between said housing and said cover;
   a plurality of bolts arranged through said plurality of collar members, said plurality of bolts serving to attach said cover to said housing; and
   a plurality of solenoid valves disposed between said housing and said cover.

* * * * *